(12) United States Patent
Markling

(10) Patent No.: US 6,913,324 B2
(45) Date of Patent: *Jul. 5, 2005

(54) BLOW MOLDED WHEEL WITH AXLE RETAINER

(75) Inventor: Floyd F. Markling, Wiersdale, FL (US)

(73) Assignee: Poly-Flex, Inc., Walworth, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/268,227

(22) Filed: Oct. 10, 2002

(65) Prior Publication Data

US 2004/0070262 A1 Apr. 15, 2004

Related U.S. Application Data

(63) Continuation of application No. 09/701,759, filed as application No. PCT/US99/12424 on Jun. 3, 1999, now Pat. No. 6,520,597, which is a continuation-in-part of application No. 09/090,618, filed on Jun. 4, 1998, now Pat. No. 6,170,920.

(51) Int. Cl.$^7$ ................................................ B60B 7/06
(52) U.S. Cl. ........................... 301/111.01; 301/64.701
(58) Field of Search ..................... 301/111.01, 111.03, 301/111.04, 111.07, 112, 118, 119, 120, 121, 122, 64.701, 64.705, 64.704; 264/249, 271.1, 274

(56) References Cited

U.S. PATENT DOCUMENTS

| | | | | |
|---|---|---|---|---|
| 3,207,830 | A | | 9/1965 | Aldington .................... 264/249 |
| 3,497,952 | A | | 3/1970 | King et al. .................... 264/249 |
| 3,694,540 | A | | 9/1972 | Slan ............................ 264/249 |
| 3,730,594 | A | * | 5/1973 | Zbikowski ............. 301/64.701 |
| 3,894,776 | A | * | 7/1975 | Black .................... 301/64.706 |
| RE30,030 | E | | 6/1979 | Coran et al. ................. 152/323 |
| 4,330,914 | A | * | 5/1982 | Hood ......................... 29/894.3 |
| 4,358,162 | A | | 11/1982 | Schneider et al. ........... 301/122 |
| 4,428,899 | A | | 1/1984 | van Manen .................. 264/271 |
| 4,592,595 | A | | 6/1986 | Freeman ....................... 301/64 |
| 4,674,759 | A | | 6/1987 | Parker ......................... 301/122 |
| 4,870,736 | A | | 10/1989 | Kacalieff ....................... 301/64 |
| 5,104,198 | A | * | 4/1992 | Prout et al. ............. 301/64.705 |
| 5,316,377 | A | * | 5/1994 | Markling et al. ....... 301/64.701 |
| 5,368,371 | A | | 11/1994 | Markling ...................... 301/64 |
| 5,518,682 | A | * | 5/1996 | Markling et al. ........... 264/516 |
| 5,934,763 | A | | 8/1999 | Conradsson et al. .......... 301/64 |
| 6,170,920 | B1 | * | 1/2001 | Markling ............... 301/111.01 |
| 6,361,121 | B1 | | 3/2002 | Morris | |
| 6,375,274 | B1 | | 4/2002 | Morris | |
| 6,464,305 | B2 | * | 10/2002 | Markling ............... 301/111.03 |
| 2002/0089229 | A1 | | 7/2002 | Morris | |

FOREIGN PATENT DOCUMENTS

EP          508902       * 10/1992    ............ 301/111.01

* cited by examiner

*Primary Examiner*—Russell D. Stormer
(74) *Attorney, Agent, or Firm*—D L Tschida

(57) ABSTRACT

A molded plastic wheel includes a seamless annular body that is integrally molded from a first material exhibiting a first density and includes a hollow hub having an axle bore and hollow spokes that radially extend from the hub to a hollow box defined by planar first and second side wall surfaces, which extend from the spokes substantially orthogonal to a tread surface that lies parallel to the axle bore. Cavities of the hub, the spokes, and the box communicate with each other. A tread piece having a channel shape with first and second side pieces projects substantially orthogonal to a connecting tread band. The tread piece is separately molded from a second material exhibiting a second density different from the first material. The tread piece is stretch fitted over the box such that the tread band overlies the tread surface and the side pieces abut the side wall surfaces.

17 Claims, 22 Drawing Sheets

BLOW MOLDED WHEEL WITH AXLE RETAINER

RELATED APPLICATIONS

This application is a continuation of Ser No. 09/701,759, filed Dec. 2, 2000 and entitled "Blow Molded Wheel With Axle Retainer", now U.S. Pat. No. 6,520,597, which is a national phase application of PCT International Application Serial No. PCT/US99/12424, filed Jun. 3, 1999, which is a continuation-in-part of U.S. patent application Ser. No. 09/090,618, filed Jun. 4, 1998, now U.S. Pat. No. 6,170,920, the disclosures of all of which are hereby incorporated by reference in their entirety.

BACKGROUND OF THE INVENTION

The present invention relates to plastic wheels and, in particular, to a blow molded wheel having a spring biased axle retainer and a fitted tread piece.

Varieties of pneumatic and composite wheels have been developed that include integral axle retainers. Some available composite wheels include an injection-molded hub that supports a molded rubber tread piece at a flanged rim. The tread piece is separately attached to the hub, such as by stretching. A spring-biased pin is molded into the hub and the pin projects into the bore of an axle support. With the attachment of the wheel to an axle having a mating annular recess, the pin depresses and expands into the recess to permanently secure the wheel to the axle. The pin otherwise is not exposed to facilitate detachment of the wheel.

An all plastic wheel can provide a cost-effective alternative. However, all plastic wheels are generally not available that include an integral retainer. A blow-molded wheel that does include a retainer is shown at U.S. Pat. No. 5,368,371. The retainer consists of annular tabs that extend into an axle bore and that mount to a grooved recess at a mating axle. The strength of the tabs can limit the type of applications to which such wheels are placed. The tabs are also prone to damage, if the wheels are removed.

The present invention was developed to provide an improved blow-molded plastic wheel having an integral axle retainer. The wheel provides an externally accessible, spring biased retainer pin that is inserted into a blow-molded wheel. The retainer pin can mount in a discrete housing that is fitted to the wheel or a cavity formed into the wheel. In a preferred construction, the retainer pin radially projects from a pin retainer sleeve that is fitted to an axle sleeve. A bore and adjoining cavity at the wheel support the axle sleeve to provide a load-bearing surface for the axle and align the pin to the axle. The wheel also includes a tread surface that can be molded as part of the wheel or that can be separately attached to the wheel.

SUMMARY OF THE INVENTION

It is accordingly a primary object of the invention to provide a blow-molded wheel with an integral axle retainer.

It is a further object of the invention to provide a wheel having an axle retainer that indexes to a separately molded wheel and includes a pin and axle sleeve that extend transverse to one another.

It is a further object of the invention to provide a wheel with an axle retainer pin that can be released from the axle after mounting.

It is a further object of the invention to provide a retainer that can be mounted to the wheel prior to final cure.

Several of the foregoing objects, advantages and distinctions of the invention are obtained in a presently preferred blow-molded wheel. The wheel is blow molded in conventional fashion and includes a cavity at one of the spokes that is shaped to accept a spring biased retainer. The cavity opens to an axle bore at the wheel. The retainer is set into the cavity immediately upon the wheel being withdrawn from the mold, while the plastic is warm. The plastic shrinks around the retainer as it cools and permanently secures the retainer to the wheel.

The retainer includes a pin sleeve that supports a spring within a longitudinal bore. The spring biases the retainer pin to project into a longitudinal bore of an axle sleeve. The axle sleeve concentrically mounts within the axle bore. The bore of the axle sleeve acts as a bushing and provides a load-bearing surface for the axle. The bore of the axle sleeve extends transverse to the bore of the pin sleeve. An opening is provided through the walls of the pin sleeve to permit release of the pin from the axle.

Still other objects, advantages, distinctions and constructions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

DESCRIPTION OF THE PREFERRED EMBODIMENT

Figure 1:
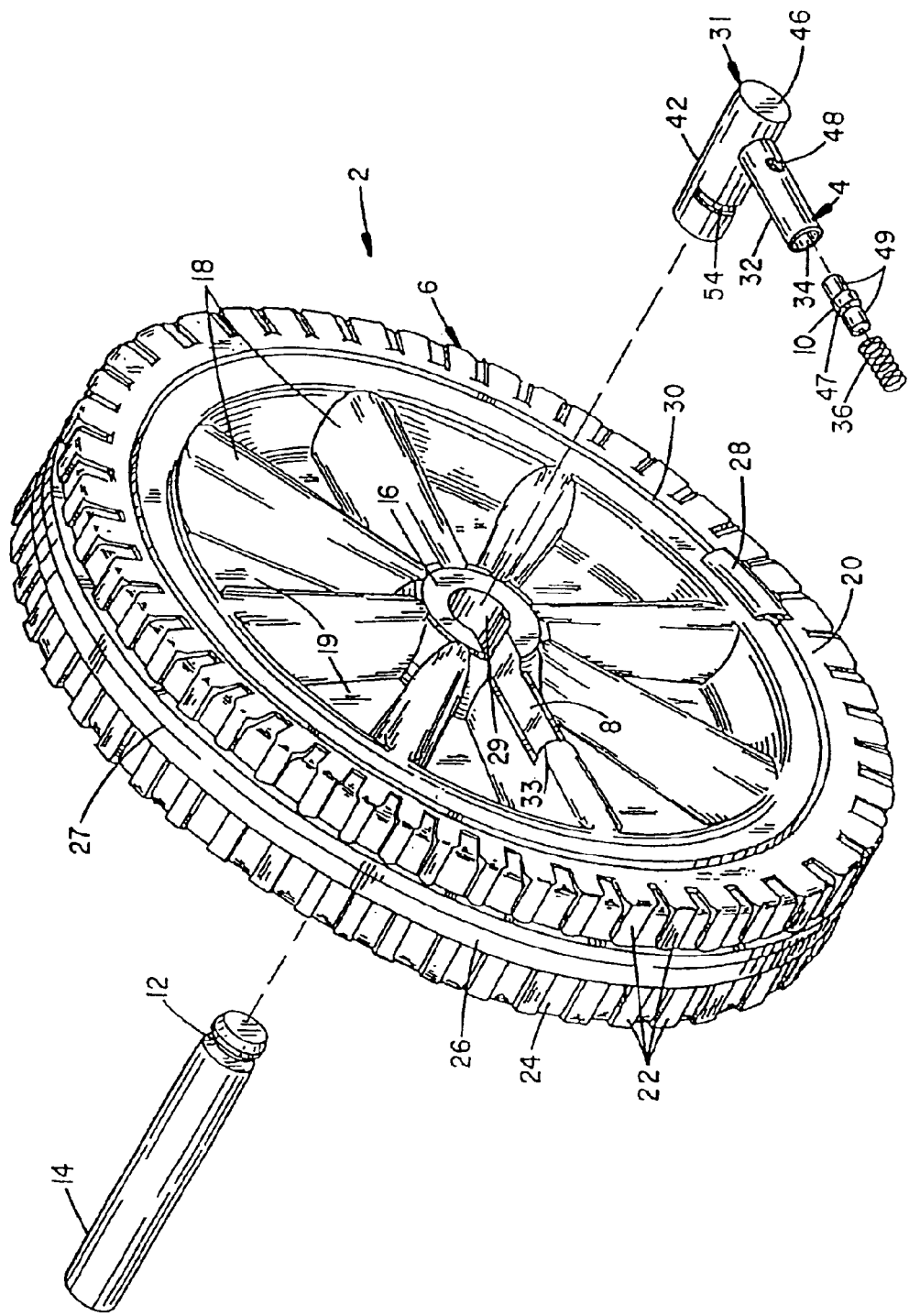
FIG. 1 is a perspective view shown in exploded assembly to a wheel constructed with a releasable axle retainer assembly.
Figure 2:
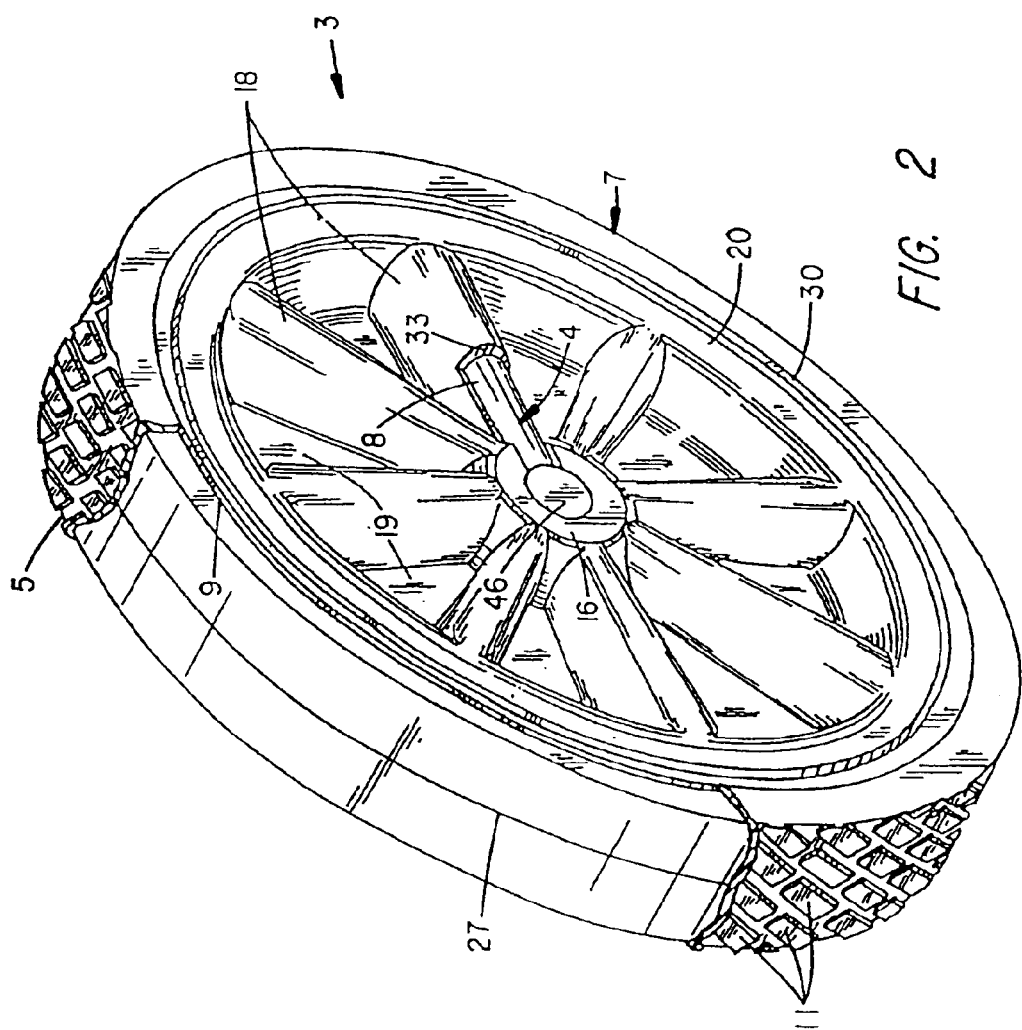
FIG. 2 is a perspective view shown in partial cutaway to a blow-molded wheel having a tread piece mounted over the wheel and fitted with an axle retainer assembly.
Figure 3:
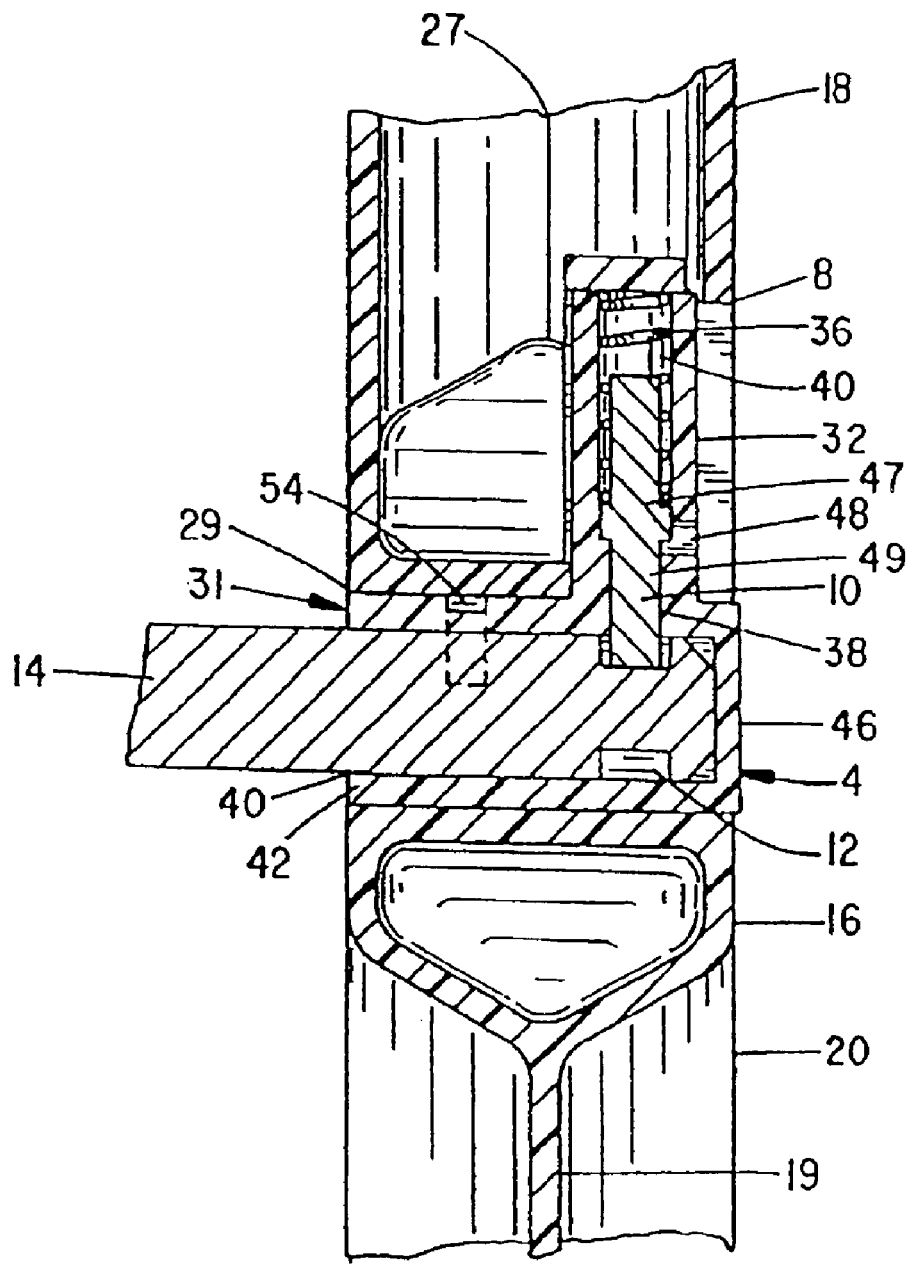
FIG. 3 is a partial section view through the axle and retainer of FIG. 1, when mounted together.
Figure 5:
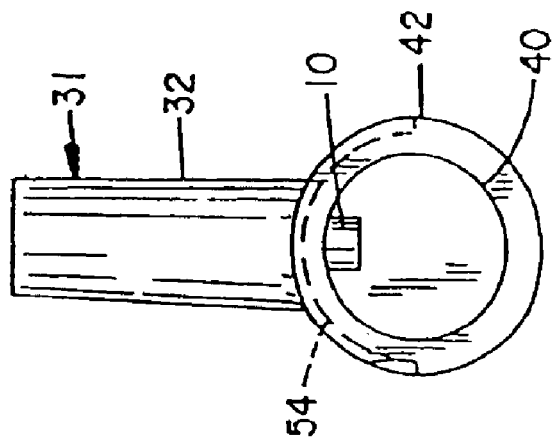
FIG. 5 is a rear view of the retainer.

Referring to FIGS. 1, 2 and 3, views are shown to improved wheels 2 and 3 that are fitted with an axle retainer assembly 4. The wheels 2 and 3 are constructed from blow-molded plastic wheels 6 and 7. The wheels 6 and 7 each include a cavity 8 that receives an axle retainer assembly 4. A double-ended pin 10 of the assembly 4 aligns with and mounts to an annular groove 12 of an axle 14, reference FIG. 3.

The wheels 6 and 7 are blow-molded in conventional fashion and provide a hub 16 and from which a number of spokes 18 and intermediate flat webs 19 radiate to an annular box or rim 20. The wheel 6 includes a number of lugged treads 22. The treads 22 are molded into a surface 24 that engages the ground. A raised band 26 projects around the circumference of the wheel 6 and above the treads 22 at the center of the tread surface 24. A parting line defined by the molding operation extends around the center of the band 26. An accessory trim piece or whitewall 28 can be attached to an annular grove 30 that is formed into one or both exposed side wall faces of the box 20.

The blow-molded wheel 3 of FIG. 2 is substantially the same as the wheel 2, except a separately molded tread piece 5 is mounted to the box 20. A smooth, recessed surface 7a of the box 20 includes a flange 9 and to which the tread piece 5 is aligned. The tread piece 5 is molded from an ethylene methyl acrylate (EMA) copolymer, although an EEA, EVA or LLDPE material, among other materials could be used. A number of lugged treads 11 are molded into the tread piece 5. The tread piece 5 is stretch fitted over the wheel 7 while warm. The density of the tread piece 5 is selected to provide a durable, long-wearing surface. The tread piece 5 also minimizes rolling sounds of the wheel 3 over certain surfaces and which sounds otherwise can be magnified due to the hollow cavity at the wheel 3.

Returning attention to FIG. 1, the cavity 8 is molded into one of the spokes 18. The cavity 8 opens at one end into an body bore 29. An opposite end provides a closed wall 33. A housing 31 of the assembly 4 includes a pin sleeve 32 that mounts within the cavity 8. The pin 10 is supported within a bore 34 of the pin sleeve 32 and is biased to permit reciprocating movement in conjunction with a spring 36. The pin 10 projects through an aperture 38 of the bore 34, reference FIG. 3, and into a longitudinal bore 40 of an axle sleeve 42 that extends transverse to the pin sleeve 32. The spring 36 abuts an end of the recess 33 at an open end of the pin sleeve 32.

Figure 6:
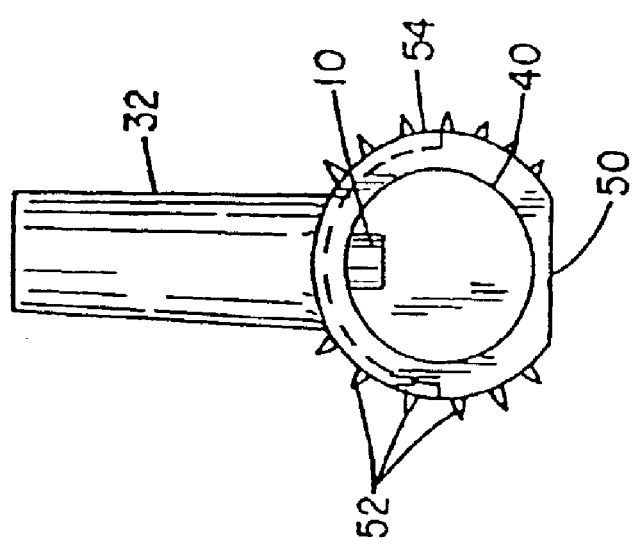
FIG. 6 is a rear view of a retainer wherein the external surface is formed to enhance attachment to the blow-molded wheel.

The bore 40 separately accepts the axle 14. The bore 40 provides a load-bearing surface for the axle 14. A cover 46 closes the end of the housing 31 and bore 40. The housing 31 is retained to the wheel 6 at the pin and axle sleeves 32 and 42. The transverse orientation of the pin and axle sleeves 32 and 42 to one another assures that the retainer assembly 4 does not loosen and rotate with the wheel 6. The retainer housing 31 can be bonded to the wheel 6. Presently it is secured through the shrinkage of the wheel material. If required, retention can be enhanced by forming the external walls of the retainer to include shaped surfaces such as described below in relation to FIGS. 6 and 7.

Figure 4:
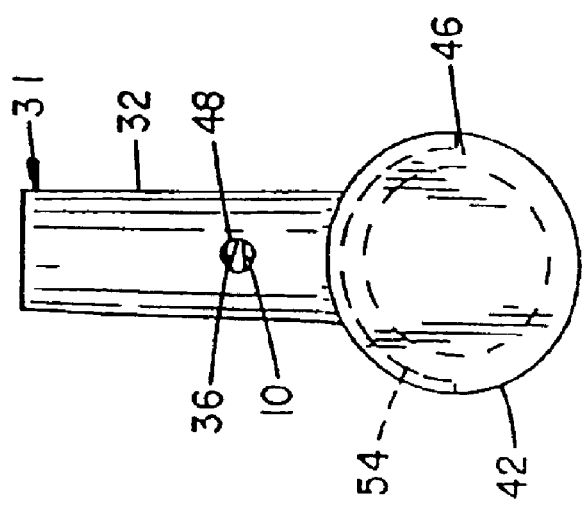
FIG. 4 is a front view of the retainer.

With additional attention to FIGS. 3 and 4, an aperture 48 extends through a side wall of the axle sleeve 42 and is exposed at the wheel 6 to permit access to the pin 10. By inserting a tool through the aperture 48, a shoulder 47 of the pin 10 can be engaged and the pin 10 can be depressed to release one of a pair of ends 49 from the axle 14. The aperture 48 can be flashed over, such as in FIG. 2, when molding the housing 31 to prevent casual access to the pin 10.

Depending upon the application, the wheels 6 and 7 can be molded from a variety of types of plastic. The type of plastic and density of material can be varied to a particular application and the load and wear specifications for a particular wheel. The configuration and size of the wheels 6 and 7 can also be varied. The wheels 6 and 7 are presently molded from a high-density polyethylene material and each is constructed to a 12-inch diameter. A variety of other known materials can be used to equal advantage.

The retainer housing 31 is molded from a material that is compatible to the wheel material. An HDPE material is presently used. Depending on the application, however, the housing 31 can be constructed from a variety of other materials including various metals and plastics. The pin 10 is constructed from metal. Various other materials can be used provided they are able to withstand anticipated wear at the axle 14.

After extracting the wheel 6 from its mold and while the plastic is warm, the retainer assembly 4 is fitted to the cavity 8 and the bore 31. As the wheel 6 cools, the material shrinks around the axle sleeves 32 and 42 to permanently mount the retainer assembly 4 to the wheel 6. Although not presently required, retention might be enhanced by shaping the external surfaces of the sleeves 32 and 42 to grip mating surfaces of the wheels 6 and 7. For example and with additional attention to FIG. 6, a flat surface 50 and/or raised projections 52 and/or one or more recesses 54 can be provided. Presently, a recessed groove 54 is included. The groove 54 separately aids in the extraction of the retainer housing 31 from an injection mold. The raised projections 52 can be formed as annular ribs or knurling.

Figure 7:
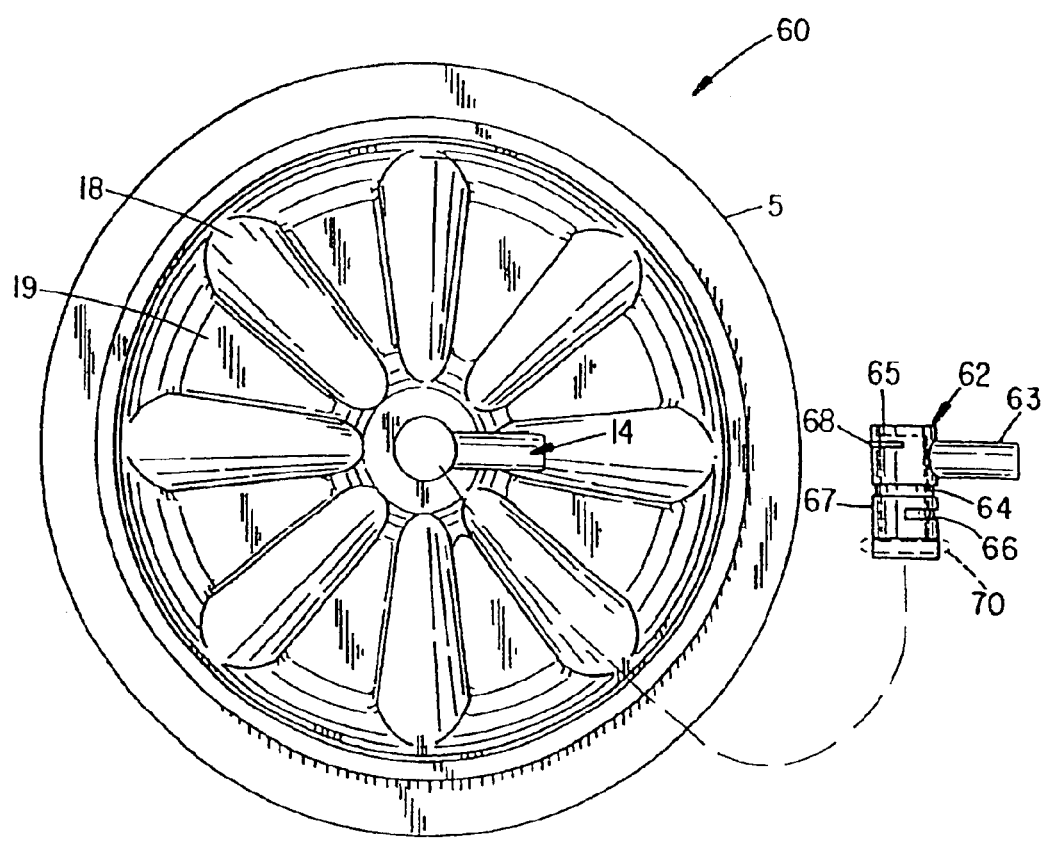
FIG. 7 is a front view of a blow-molded wheel and a retainer assembly shown in exploded assembly.
Figure 8:
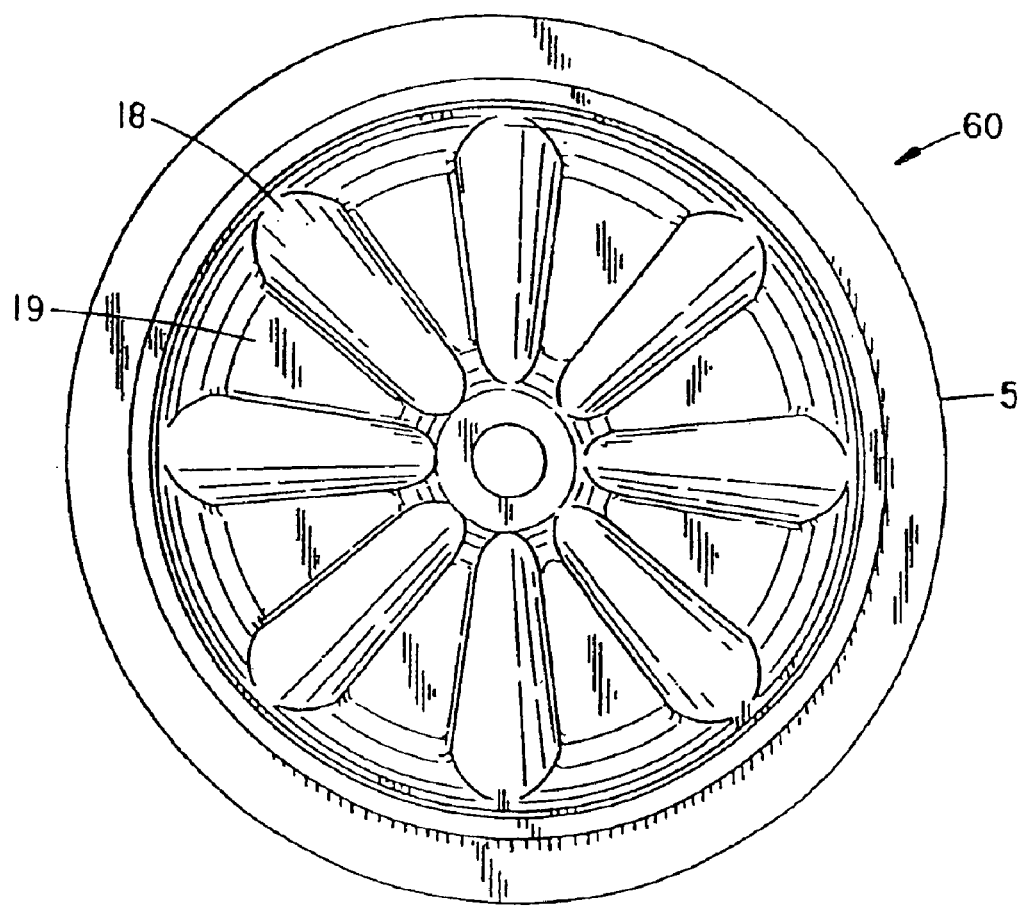
FIG. 8 is a rear view of the blow-molded wheel of FIG. 7.
Figure 9:
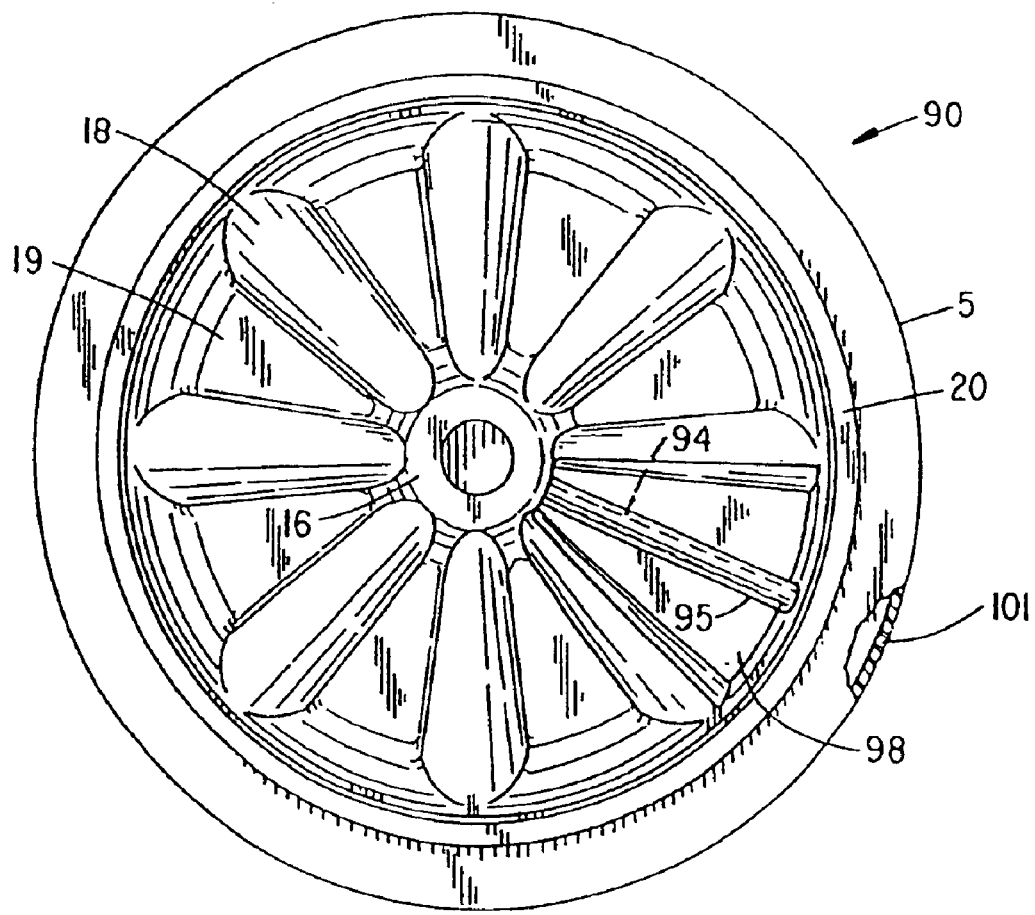
FIG. 9 is a front view of a blow-molded wheel and wherein a retainer assembly is formed to extend from the tread support surface.
Figure 10:
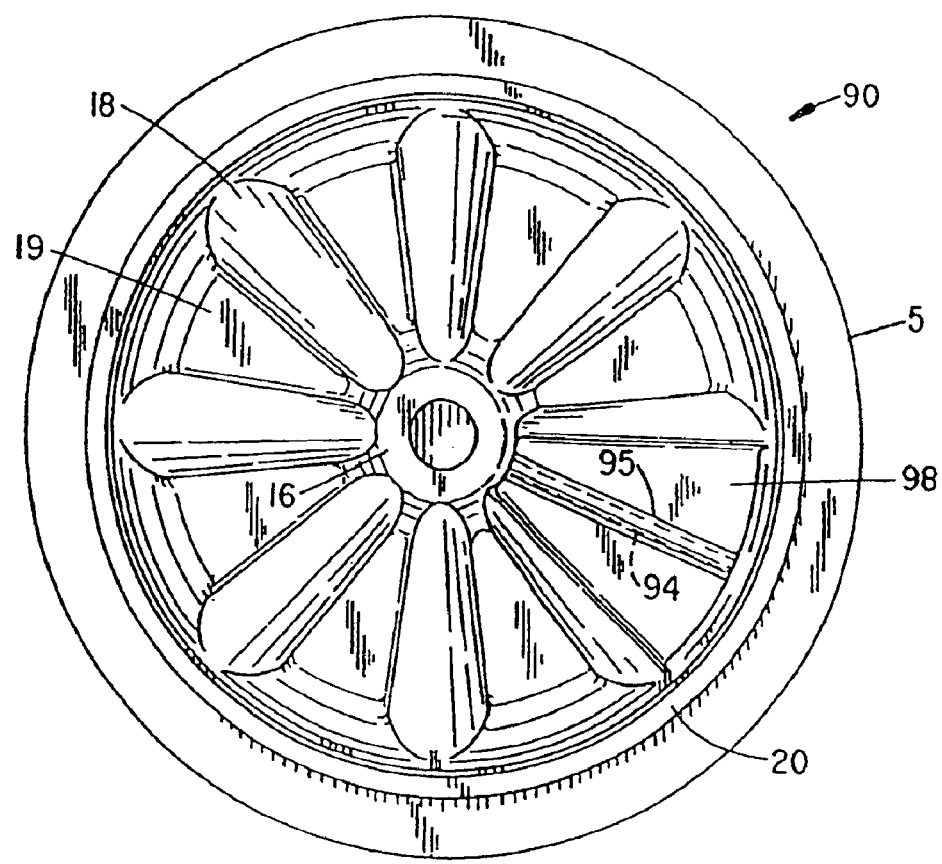
FIG. 10 is a rear view of the blow-molded wheel of FIG. 9.
Figure 11:
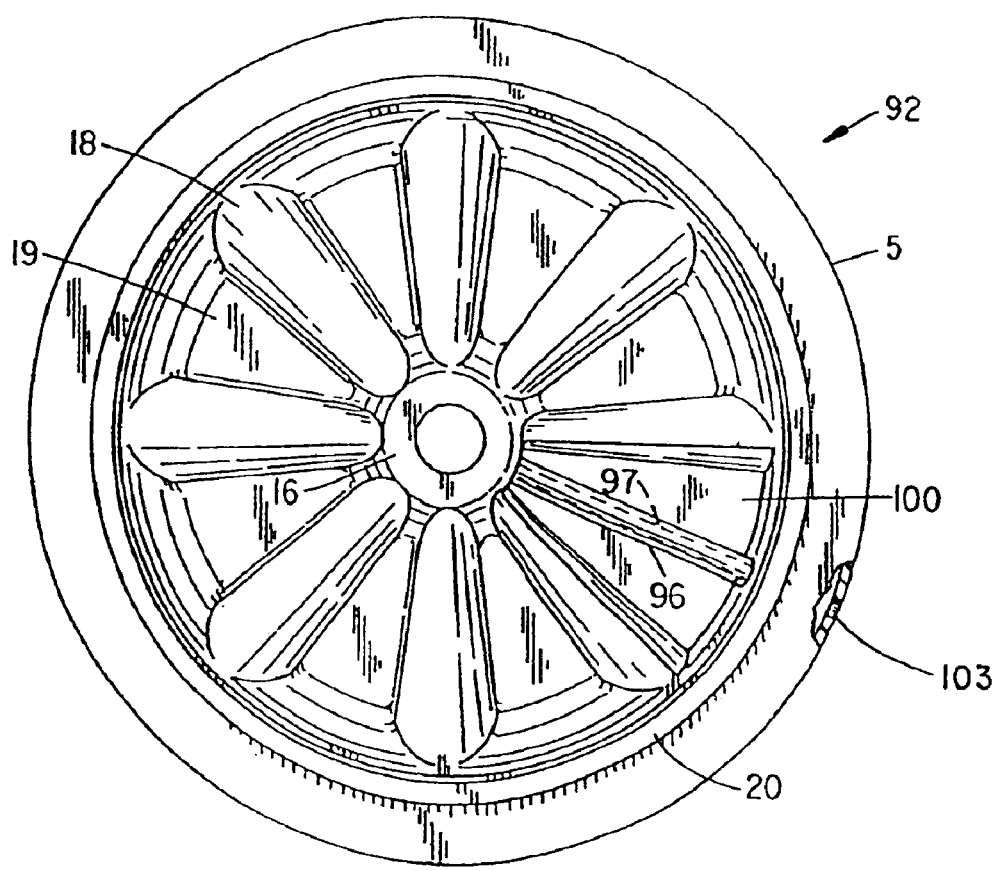
FIG. 11 is a front view of a blow-molded wheel and wherein a retainer assembly is formed to extend from the tread support surface.
Figure 12:
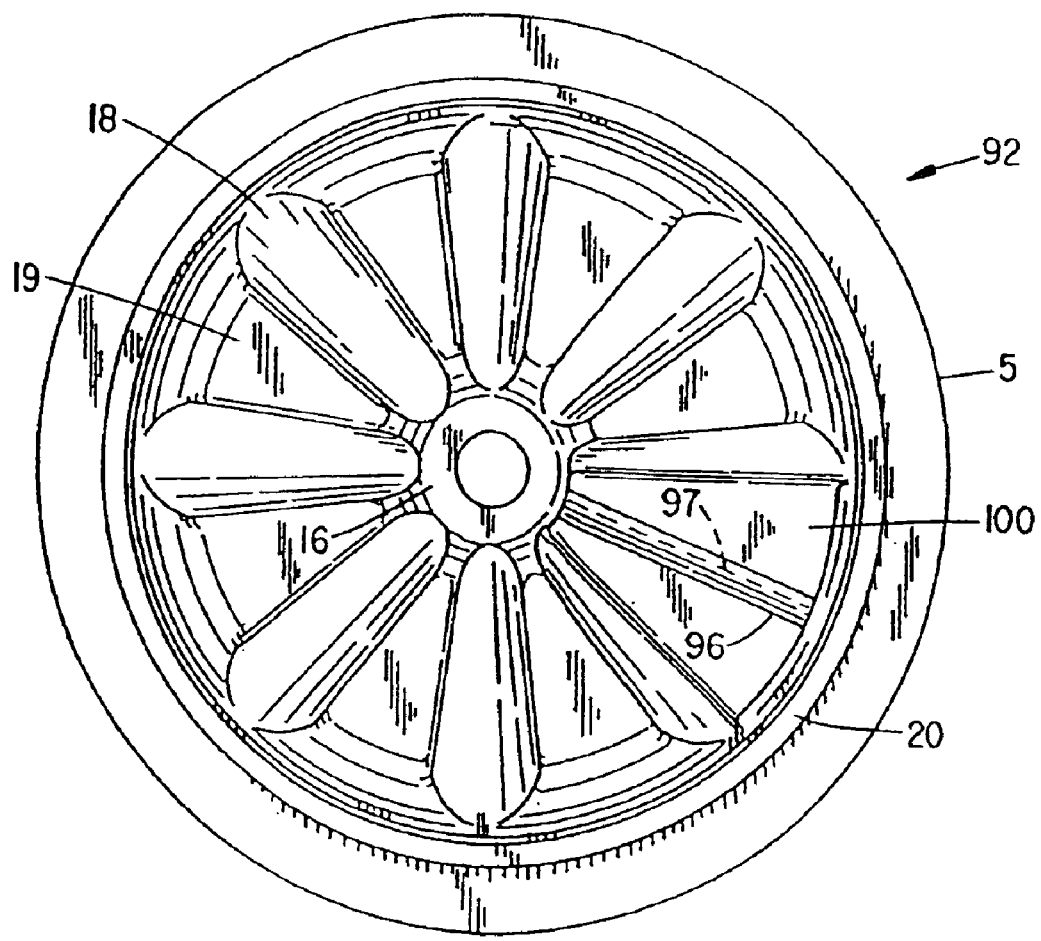
FIG. 12 is a rear view of the blow-molded wheel of FIG. 9.
Figure 13:
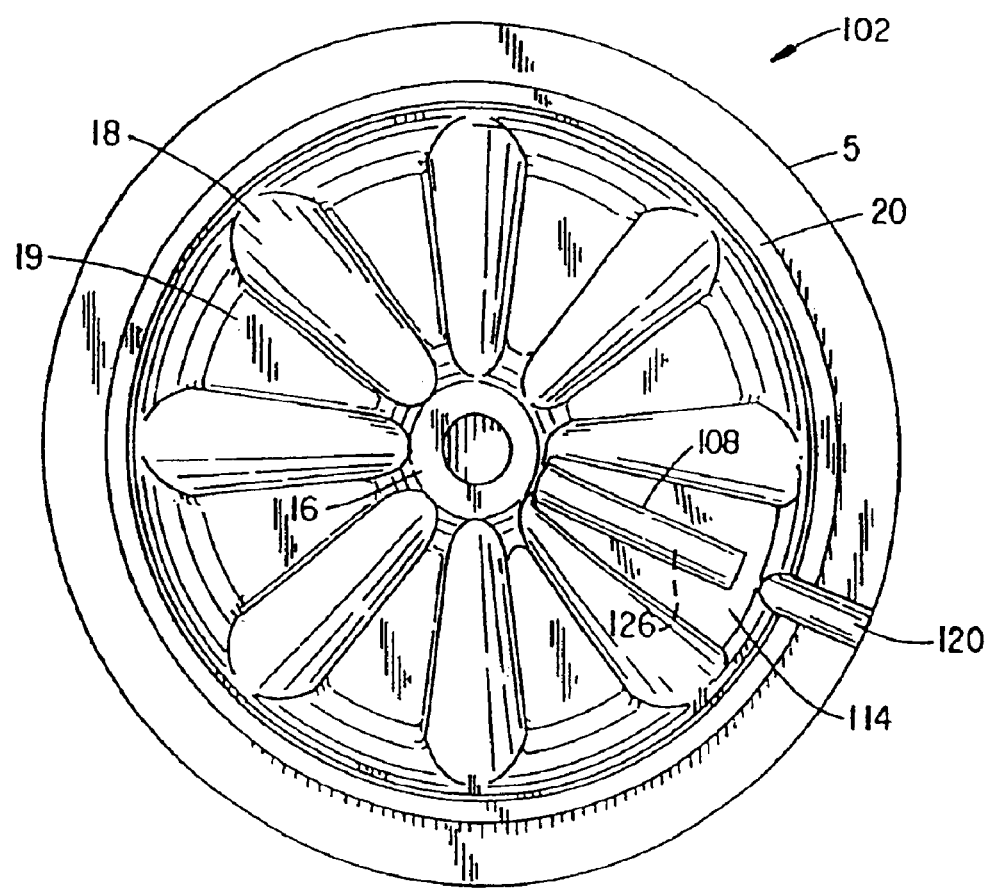
FIG. 13 is a front view of a blow-molded wheel and wherein a retainer sleeve extends from a raised web that lies parallel to a plane at the parting line of the wheel and with a groove at the box.
Figure 14:
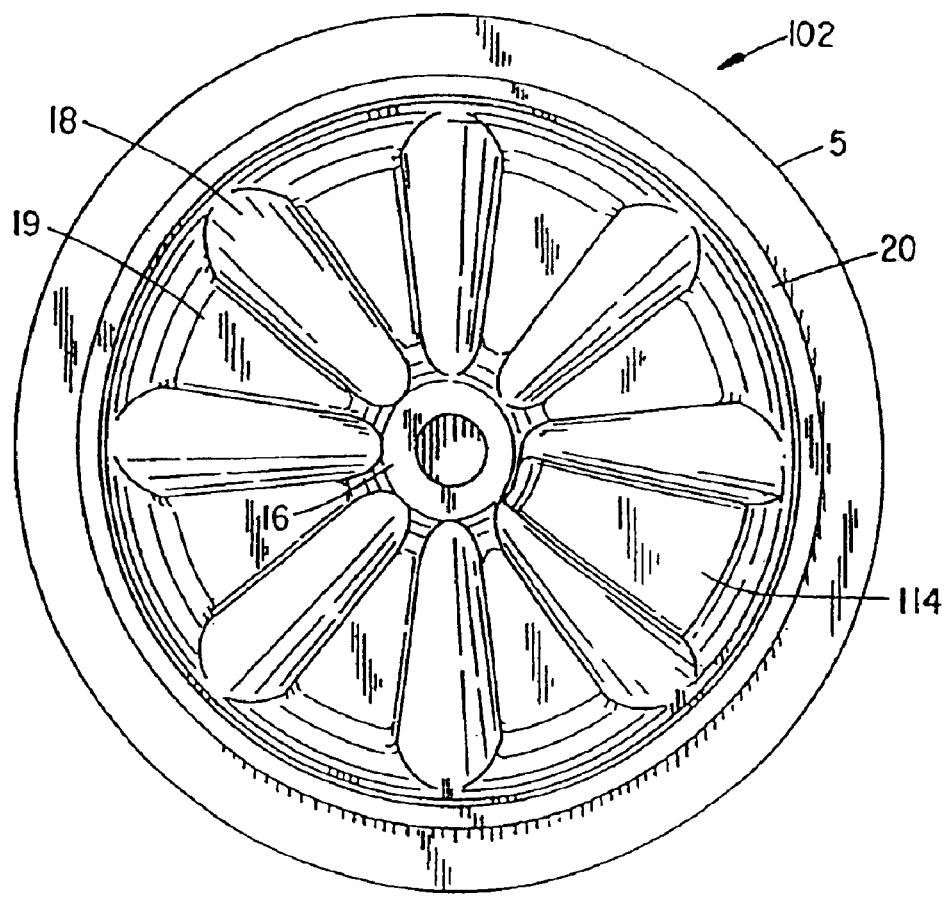
FIG. 14 is a rear view of the blow-molded wheel of FIG. 13.
Figure 15:
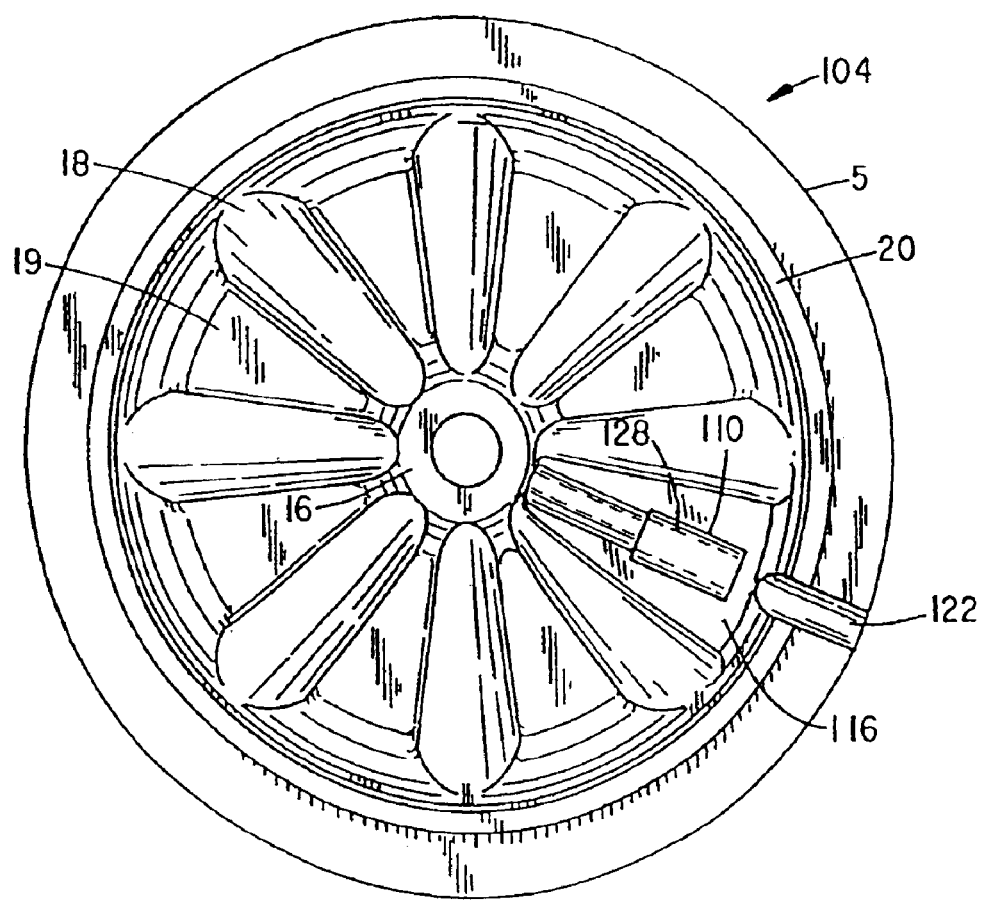
FIG. 15 is a front view of a blow-molded wheel and wherein a retainer sleeve having a two-stage bore extends from a raised web that lies parallel to a plane at the parting line of the wheel.
Figure 16:
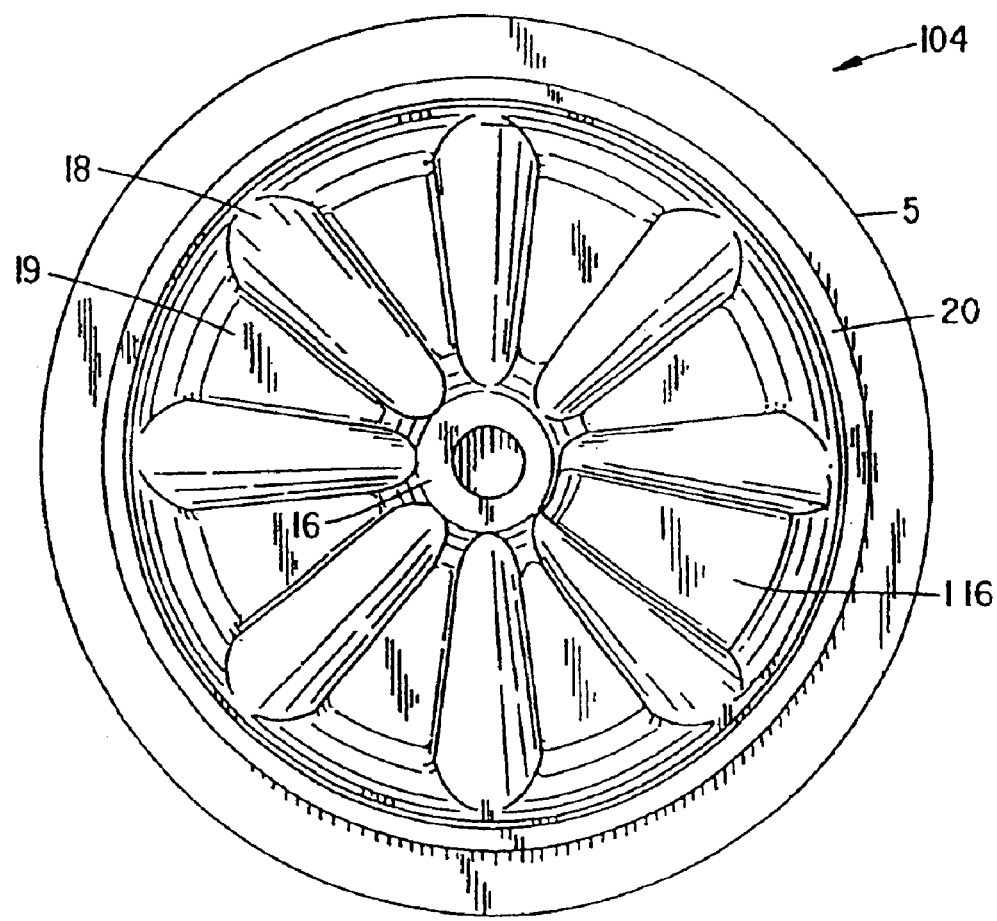
FIG. 16 is a rear view of the blow-molded wheel of FIG. 15.
Figure 17:
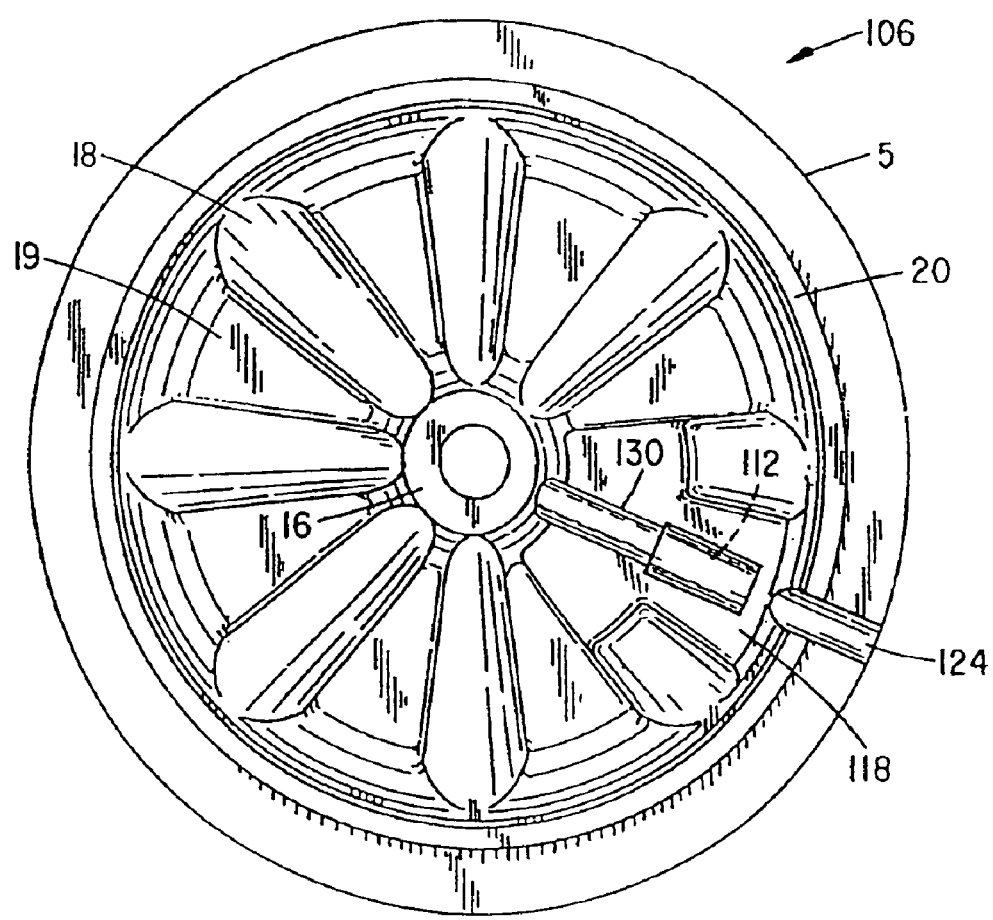
FIG. 17 is a front view of a blow-molded wheel and wherein a retainer sleeve having a two-stage bore extends from a raised web that lies parallel to a plane at the parting line of the wheel and between interrupted adjoining spokes.
Figure 18:
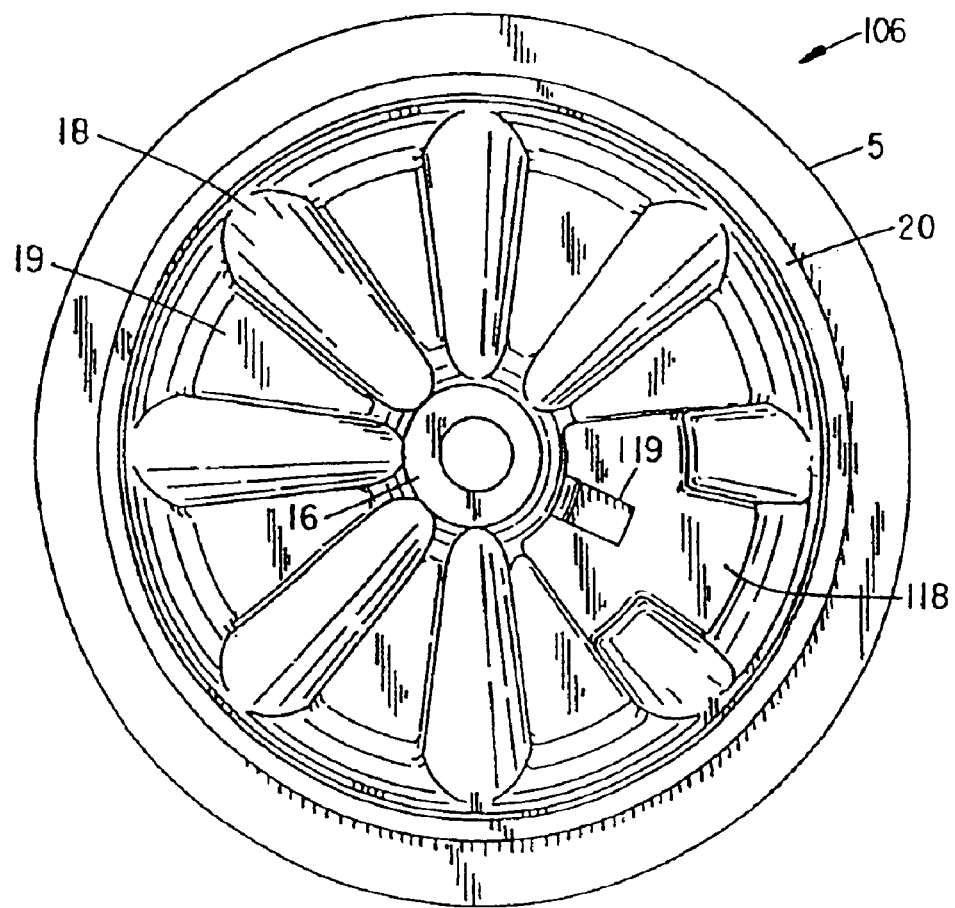
FIG. 18 is a rear view of the blow-molded wheel of FIG. 17.
Figure 19:
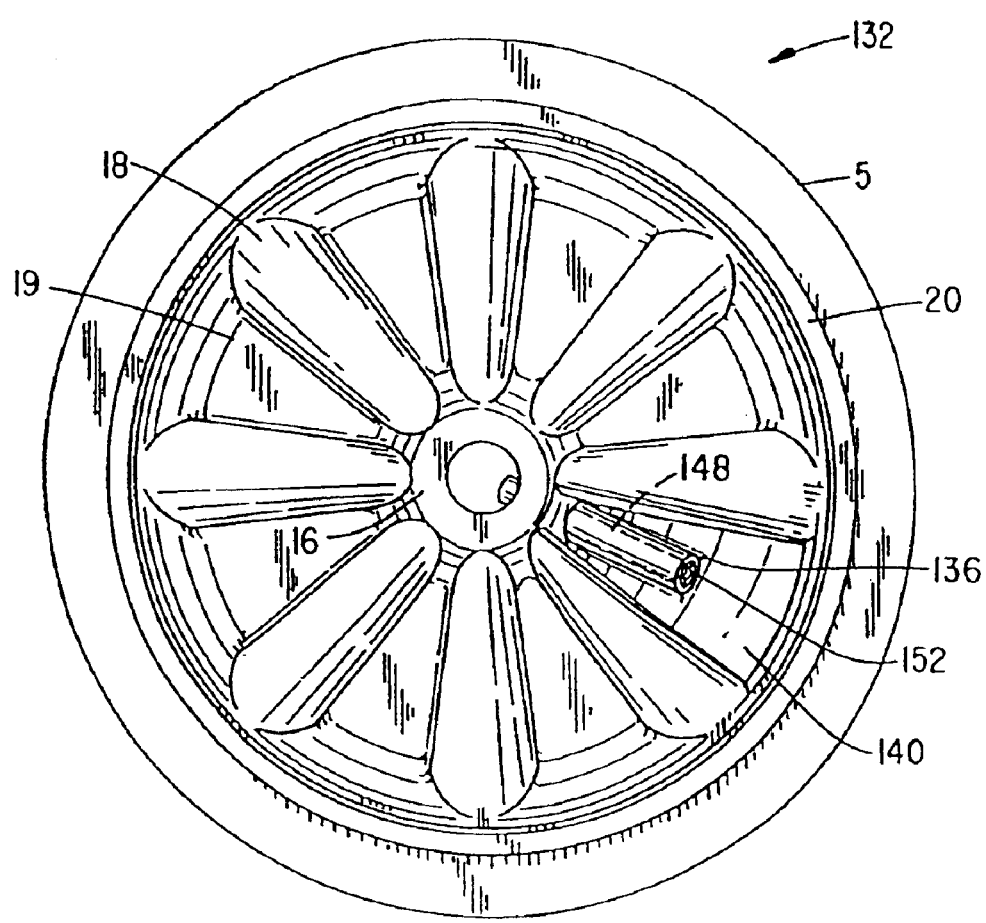
FIG. 19 is a front view of a blow-molded wheel and wherein a retainer sleeve is formed to extend from the hub at an acute angle relative to a plane at the parting line of the wheel.
Figure 20:
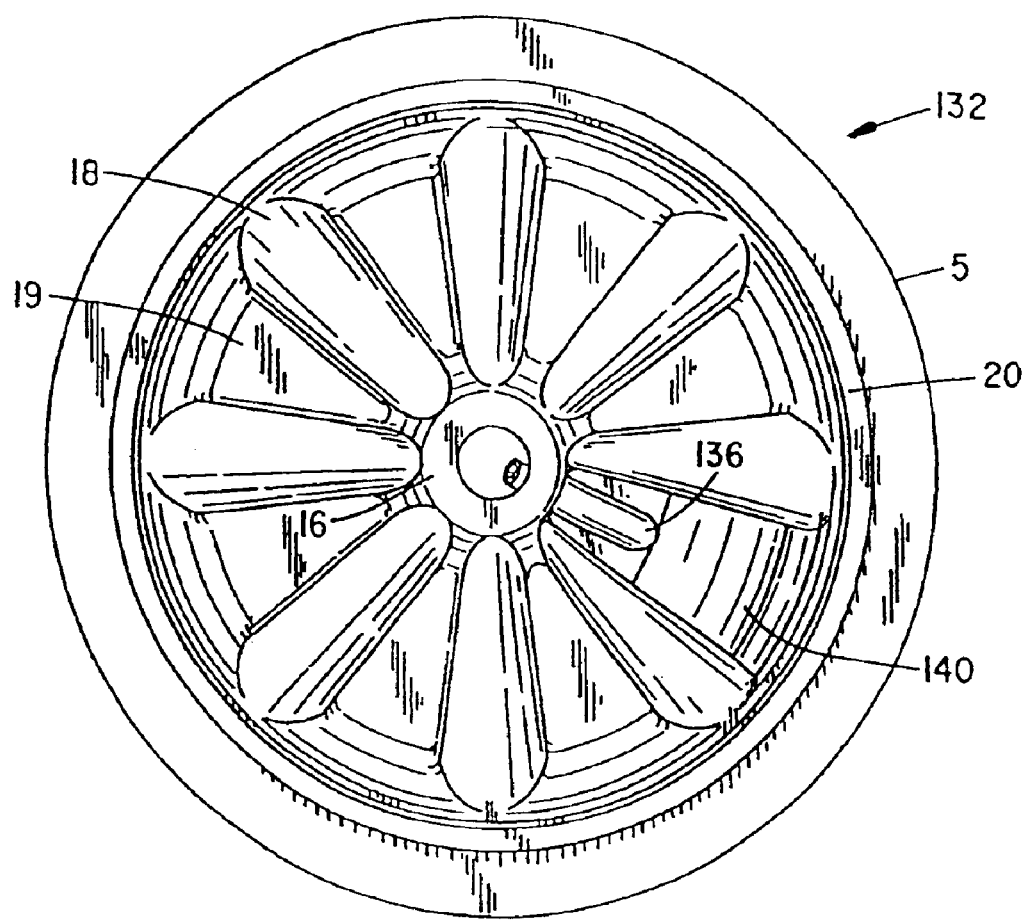
FIG. 20 is a rear view of the blow-molded wheel of FIG. 19.
Figure 21:
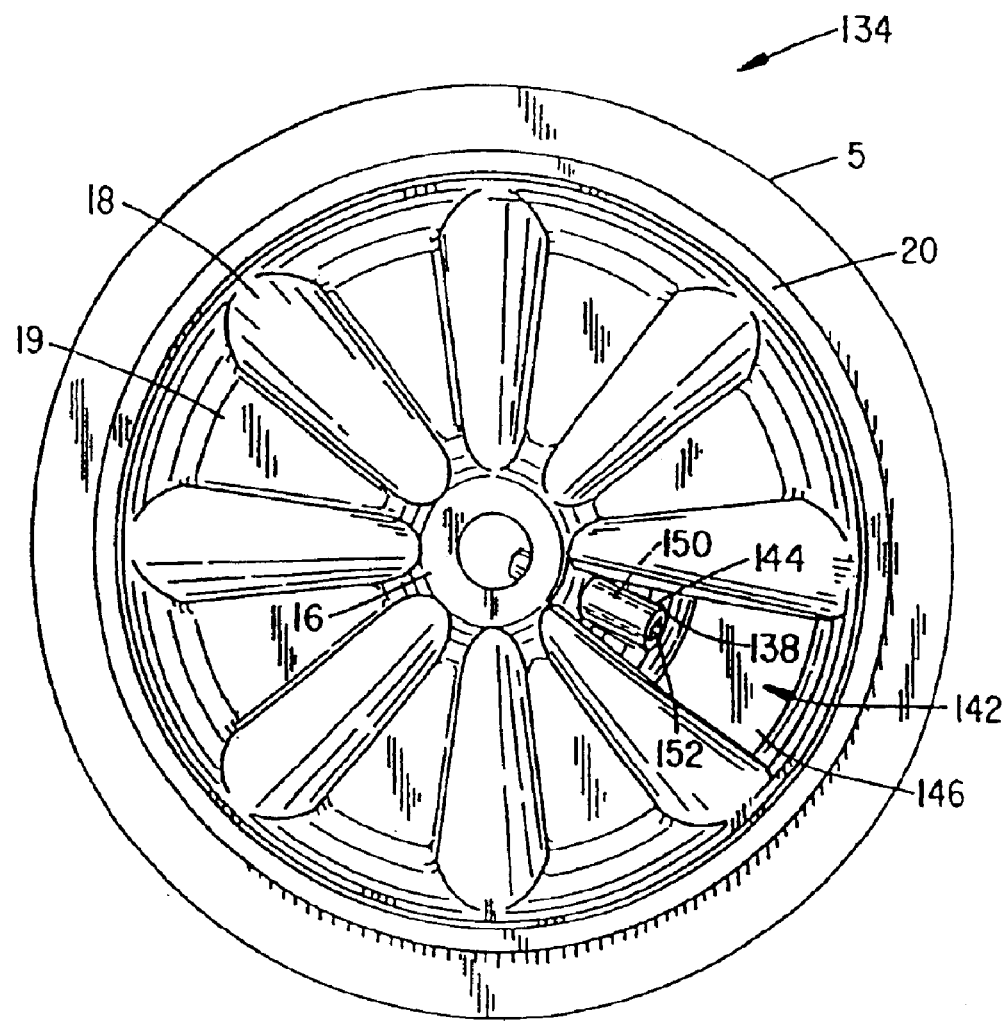
FIG. 21 is a front view of a blow-molded wheel and wherein a retainer sleeve is formed to extend at an acute angle relative to a plane at the parting line of the wheel from a raised platform at the web.
Figure 22:
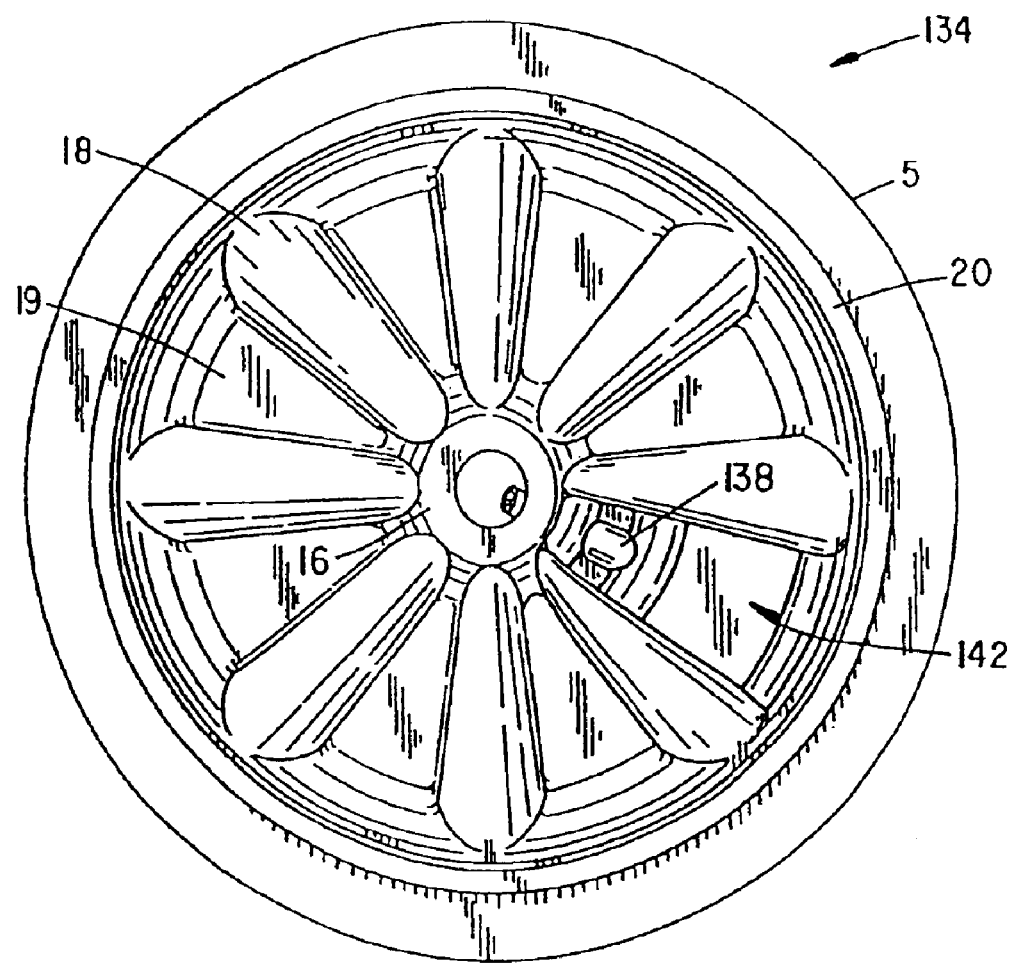
FIG. 22 is a rear view of the blow-molded wheel of FIG. 21.

FIGS. 7 and 8 depict a front and rear view to a wheel 60 that is fitted with a retainer housing 62. The housing 62 supports a retainer pin and spring at a pin sleeve 63 in a fashion similar to the retainer assembly 4. A bore 65 (shown in dashed line) through an axle sleeve 67 supports an axle 14. A groove 64 extends around the exterior of the housing 62. Separately formed into the housing 62 are a groove 66 and raised projection 68 that extend approximately one-half the circumference of the housing 62. Also shown in dashed line is a raised band 70 that can be included or not and that can have a rounded exposed surface, like an O'ring, or a wedge or ramped shape. Appropriate provisioning of the exterior surface of the housing 62 with grooves 64, 66 and/or projections 68 and 70 facilitates retention of the housing in the wheel 60.

FIGS. 9 through 12 show wheels 90 and 92 that are molded with integral retainer sleeves 95 and 96. Such a construction avoids the necessity of fitting a separate retainer housing to a finished wheel. The sleeves, however, require additional plastic and can increase the complexity of the mold and/or molding difficulty.

The sleeves 95 and 96 extend from the hub 16 to the box 20 of the wheels 90 and 92 along webs 98 and 100. The webs 98 and 100 are vertically offset from the other webs 19. The sleeve 96 exhibits a larger outer diameter than the sleeve 95 and tapers inward slightly as it extends to the box 20. The sleeves 95 and 96 include longitudinal bores 95 and 97 that receive an appropriate retainer pin and spring. The bores 94 and 97 are accessed by drilling aligned holes 101 and 103 through the periphery of the box 20 and hub 16. The drilling operation is typically performed after molding the wheels 90 and 92. The tread piece 5 and/or a plug (not shown) cover and/or fill the holes 101 and 103.

FIGS. 13 through 18 depict front and rear views of wheels 102, 104 and 106 that include retainer sleeves 108, 110 and 112 that are molded to avoid having to drill holes through the box 20 to facilitate mounting an axle retainer pin and/or spring. The retainer sleeves 108, 110 and 112 are molded into webs 114, 116 and 118 that are elevated above the webs 19 between the other spokes 18. The elevation of the webs 114, 116 and 118 is determined relative to the necessary boring operations. The web 118 also includes a slight recess 119 that is visible at FIG. 18.

Aligned grooves 120, 122 and 124 are molded into the box 20 of the wheels 102, 104 and 106 to facilitate forming the bores 126, 128 and 130 of the retainer sleeves 108, 110 and 112. The grooves 120, 122 and 124 are shown exposed, although are normally substantially covered by the tread piece 5. The bores 128 and 130 are formed with two differing internal diameters that define an internal shoulder that limits the movement of the retainer pin. Upon fitting an appropriate retainer pin and bias spring mechanism into the retainer sleeves 94, 96, 108, 110 and 112, an end cap is secured to the sleeves. A threaded end cap is typically used, although a variety of other plugs can be substituted, provided they securely retain the retainer pin in the pin sleeve.

Two other alternative wheels 132 and 134 are shown at FIGS. 19 through 22. The wheels 132 and 134 include retainer sleeves 136 and 138 that extend at acute angles relative to a plane that contains the parting line of each wheel. The sleeves extend along webs 140 and 142. The web 140 extends from the hub 16 at a continuous slope. The web 142, in contrast, provides an elevated interior portion 144 that is raised above an outer portion 146. Bores 148 and 150 extend through the sleeves 136 and 138. Upon drilling the sleeves, fitting appropriate retainer pins and springs, a threaded end cap 152 is secured to each sleeve 136 and 138.

Figure 23:
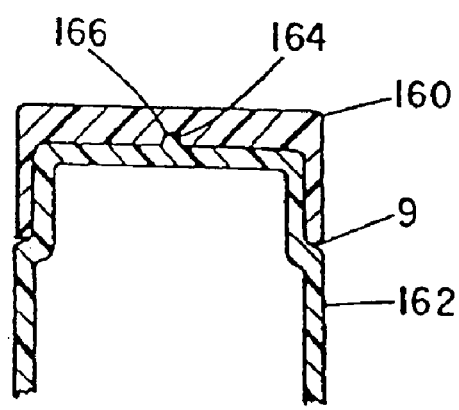
FIG. 23 is a cross section view through a wheel having a raised parting line that mounts to an aligned groove at a mating tread piece.

FIG. 23 lastly depicts a cross section view to the mounting of an alternative tread piece 160 to a blow-molded wheel 162. The wheel 162 is essentially similar to the wheel 3, except that it includes a raised projection 164 at the parting line of the wheel 162. The wheel 162 can be adapted to include any of the foregoing axle retainers or not, as desired.

The projection 164 mounts within a slot 166 molded into the tread piece 160. The mating of the slot 166 to the projection 164 stabilizes the tread piece 160 against lateral slippage and minimizes possible tread separation. In most instances, the annular flanges 9 are sufficient to prevent tread separation.

Although a single, continuous projection 164 is shown, multiple adjacent projections 164 can be provided at the periphery of the blow-molded wheel 162. The projections 164 can also be constructed to be discontinuous. The projections can exhibit rounded, ramped, or other contour shapes, when viewed in side profile, such as the projections 52 and 68.

While the invention has been described with respect to a preferred construction and considered improvements or alternatives thereto, still other constructions may be suggested to those skilled in the art. Although certain features are also shown at particular wheels, it is also to be appreciated the features can be included alone or in other combinations in other of the disclosed wheels. The foregoing description should therefore be construed to include all those embodiments within the spirit and scope of the following claims.

What is claimed is:

1. A method for constructing a wheel, comprising:
  a) blow molding a plastic wheel having a body bore, first and second side walls that project toward the body bore, and a plurality of seamless, hollow cavities that communicate with each other;
  b) extracting the wheel from a mold;
  c) fitting an assembly to the body bore, wherein the assembly includes an axle bore, a retainer member that communicates with the axle bore and resilient means for biasing the retainer member for reciprocating movement into the axle bore, and wherein the retainer member is displaced from a tread surface that lies parallel to the axle bore; and
  d) stretch mounting a separately molded annular tread piece to the wheel, and wherein the tread piece has a channel shape with first and second side pieces that project from a connecting tread band, and such that the tread band overlies the tread surface and the first and second side pieces abut the first and second side walls.

2. A method as set forth in claim 1 wherein the assembly is fit to the wheel while the wheel is warm.

3. A method as set forth in claim 1 wherein the tread piece is fit to the wheel while the tread piece is warm.

4. A method as set forth in claim 1 wherein the tread piece is fabricated from at least one of: an ethylene methyl acrylate (EMA), EEA, EVA, and LLDPE.

5. A method as set forth in claim 1 wherein the first and second side walls each include an annular flange, wherein the first and second side pieces extend substantially equidistant from the tread band, and wherein a peripheral edge of each of the side pieces abuts one of the flanges.

6. A method for constructing a wheel, comprising:
  a) blow molding an integral plastic wheel having a body bore, a tread surface, first and second side walls that project from the tread surface toward the body bore and a plurality of hollow, seamless cavities that communicate with each other;
  b) extracting the wheel from a mold; and
  c) stretch fitting a separately molded, annular tread piece to the wheel, wherein the tread piece has a channel shape with first and second side pieces that project from a connecting tread band, and such that the tread band overlies the tread surface and the first and second side pieces abut the first and second side walls.

7. A method as set forth in claim 6 wherein the tread piece is fit to the wheel while the tread piece is warm.

8. A method as set forth in claim 6 wherein the tread piece is fabricated from at least one of: ethylene methyl acrylate (EMA), EEA, EVA, and LLDPE.

9. A method for constructing a self retaining wheel, comprising:
   a) blow molding a plastic wheel having a body bore, a tread, first and second side walls that project from the tread surface toward the body bore, and a plurality of hollow, seamless, hollow cavities that communicate with each other;
   b) extracting the wheel from a mold and,
   c) while the wheel is warm, fitting a retainer housing to the body bore, wherein the retainer housing includes an axle bore, a retainer member that communicates with the axle bore, and resilient means for biasing the retainer member for reciprocating movement into the axle bore, and wherein the retainer member is displaced from the tread surface;
   d) fitting a separately molded annular tread piece to the wheel and wherein the tread piece has a channel shape with first and second side pieces that project from a connecting tread band, such that the tread band overlies the tread surface and the first and second side pieces abut the first and second side walls; and
   e) permitting the wheel to cool to air temperature.

10. A method as set forth in claim 9 wherein the tread piece is fit to the wheel while the tread piece is warm.

11. A method as set forth in claim 9 wherein the tread piece is fabricated from at least one of: an ethylene methyl acrylate (EMA) copolymer, an EEA copolymer, an EVA material, and an LLDPE copolymer.

12. A method for constructing a self retaining wheel, comprising:
   a) blow molding a plastic wheel having a body bore, a tread surface, first and second side walls that project from the tread surface toward the body bore, and a plurality of seamless, hollow cavities that communicate with each other;
   b) extracting the wheel from a mold;
   c) fitting an axle sleeve to the body bore, wherein the axle sleeve includes an axle bore, a retainer member that communicates with the axle bore and resilient means for biasing the retainer member for reciprocating movement into the axle bore, and wherein the retainer member is displaced from the tread surface; and
   d) stretch fitting a separately molded tread piece to the wheel, such that the tread piece overlies the wheel tread surface.

13. A method of constructing a plastic wheel adapted to mount to an axle, comprising the steps of:
   molding a seamless annular body from a first material exhibiting a first density and that includes a hollow hub having an axle bore and a plurality of hollow spokes that radially extend from the hub to a hollow box defined by planar first and second side wall surfaces that extend from the spokes substantially orthogonal to a tread surface that lies parallel to the axle bore, wherein seamless, hollow cavities of the hub, the spokes, and the box communicate with each other; separately molding annular tread piece having a channel shape with first and second side pieces that project substantially orthogonal to a connecting tread band from a second material exhibiting a second density different from the first material; and stretching the tread piece over the box such that the tread band overlies the tread surface and the first and second side pieces abut the first and second side wall surfaces.

14. The method as set forth in claim 13 further comprising the steps of forming a plurality of webs that extend between the spokes, forming the first and second side wall surfaces to respectively include first and second raised annular flanges, and forming peripheral edges of the first and second side pieces to abut the first and second flanges.

15. The method as set forth in claim 13 further comprising forming the tread band to have an external surface that includes a plurality of raised lugs.

16. The method as set forth in claim 13 further comprising the tread surface to include a raised annular band and forming the tread band to include an annular groove.

17. A method of constructing a wheel comprising the steps of:
   blow molding a wheel having a mating surface within a bore; extracting the wheel from a mold;
   extracting the wheel from a mold;
   shaping an axle sleeve of a retainer assembly to have an external gripping surface;
   fitting the gripping surface of the axle sleeve to the mating surface of the bore in the wheel while the wheel is warm; and
   shrinking the mating surface around the axle sleeve to integrally mount the retainer assembly to the wheel.

* * * * *